United States Patent
Horii et al.

(10) Patent No.: US 7,583,893 B2
(45) Date of Patent: Sep. 1, 2009

(54) DIGITAL CAMERA SYSTEM WITH INTERCHANGEABLE LENS ASSEMBLY

(75) Inventors: Hirofumi Horii, Asaka (JP); Kazunori Suemoto, Asaka (JP)

(73) Assignee: Fujifilm Corporation, Tokyo (JP)

( * ) Notice: Subject to any disclaimer, the term of this patent is extended or adjusted under 35 U.S.C. 154(b) by 265 days.

(21) Appl. No.: 11/259,122

(22) Filed: Oct. 27, 2005

(65) Prior Publication Data

US 2006/0093343 A1    May 4, 2006

(30) Foreign Application Priority Data

Oct. 29, 2004  (JP)  ............................. 2004-315927

(51) Int. Cl.
*G03B 17/00*  (2006.01)
(52) U.S. Cl. .................................... 396/532
(58) Field of Classification Search .................. 396/91, 396/125, 72, 80, 102, 89, 532; 348/346, 348/348; 359/698
See application file for complete search history.

(56) References Cited

U.S. PATENT DOCUMENTS

| | | | | |
|---|---|---|---|---|
| 5,170,203 A | * | 12/1992 | Kawasaki et al. | ............. 396/91 |
| 5,933,513 A | * | 8/1999 | Yoneyama et al. | .......... 382/106 |
| 5,973,856 A | * | 10/1999 | Kanbara | .................... 359/694 |
| 2004/0057712 A1 | * | 3/2004 | Sato et al. | ..................... 396/89 |

FOREIGN PATENT DOCUMENTS

JP   8-172561 A   7/1996

* cited by examiner

*Primary Examiner*—Melissa J Koval
*Assistant Examiner*—Autumn Parker
(74) *Attorney, Agent, or Firm*—Birch, Stewart, Kolasch & Birch, LLP

(57) ABSTRACT

A camera system includes a camera lens assembly with an imaging optical system through which a subject light image passes, an imaging device that obtains image data representative of the subject light image formed through the imaging optical system, an information transmission section that transmits imaging information necessary for obtaining an in-focus range for the imaging device, and an image transmission section that transmits the image data obtained by the imaging device; and a camera body with a connection section on which the camera lens assembly is detachably mounted, an image receiving section that receives image data; an image processing section that applies a predetermined image processing to the image data received by the image receiving section, and an information receiving section that receives the imaging information.

4 Claims, 9 Drawing Sheets

DIGITAL CAMERA SYSTEM WITH INTERCHANGEABLE LENS ASSEMBLY

BACKGROUND OF THE INVENTION

1. Field of the Invention

The present invention relates to a camera system comprising: a camera lens assembly that is loaded with an image taking optical system for forming a subject light image and an imaging device that reads the subject light image to generate image data; and a camera body on which the camera lens assembly is detachably mounted, the camera body applying a predetermined image processing to the image data.

2. Description of the Related Art

Hitherto, there is known an interchangeable lens digital camera in which an interchangeable image taking lens is mounted on a camera body incorporating an imaging device. According to the interchangeable lens digital camera, a subject light image formed by an image taking lens is fed to the imaging device provided on the camera body to create photographic image data. Accordingly, it is possible to reuse an interchangeable lens, which is used in a film type of single-lens reflex camera for recording a photographic image on a silver halide film.

However, for example, in the event that a large scale of image taking lens, which is excellent in an optical property, is mounted on a camera main body that incorporates therein a small type of imaging device that is low in resolution, while the image taking lens forms the subject light image with great accuracy, the imaging device cannot read the subject light image with great accuracy. This involves a problem that it is difficult to make the best use of a property of the image taking lens.

In this respect, Japanese Patent Application Laid Open Gazette TokuKai Hei. 8-172561 discloses an interchangeable lens assembly digital camera in which a camera lens assembly incorporating therein an image taking lens and an imaging device is mounted on a camera body. According to the technology disclosed in Japanese Patent Application Laid Open Gazette TokuKai Hei. 8-172561, a provision of CCD suitable for a size of the image taking lens and an optical property in the camera lens assembly beforehand makes it possible to obtain a high picture quality of photographic image through performing photography making the best use of the image taking lens.

In the field of a digital camera, the 35 mm corresponding focal length (a focal length on the 35 mm filmy, a depth of field, and an in-focus range are computed in accordance with a size of an imaging device. A user's confirmation of the 35 mm corresponding focal length makes it possible to recognize a view angle of photography in conversion into a familiar film type of camera. Further, a user's confirmation of the depth of field, and the in-focus range makes it possible to recognize as to what distance range of the subject from the camera can be focused, so that the user can perform photography through focusing to a plurality of subjects mutually different from one another in distance.

However, according to the interchangeable lens assembly digital camera disclosed in Japanese Patent Application Laid Open Gazette TokuKai Hei. 8-172561, the image taking lens and the imaging device are provided on the camera lens assembly in form of a set. Accordingly, when the taking lens is interchanged, the imaging device is together interchanged. Thus, this involves such a problem that a size of the imaging device is greatly changed, and as result, it is impossible to compute the depth of field and the in-focus range.

SUMMARY OF THE INVENTION

In view of the foregoing, it is an object of the present invention to provide a camera system comprising: a camera lens assembly that is loaded with an image taking optical system for forming a subject light image and an imaging device that reads the subject light image to generate image data; and a camera body on which the camera lens assembly is detachably mounted, wherein the camera system is capable of computing the depth of field and the in-focus range, even if the camera lens assembly is interchanged.

To achieve the above-mentioned objects, the present invention provides a camera system comprising:

a camera lens assembly comprising an imaging optical system through which a subject light image passes, an imaging device that obtains image data representative of the subject light image formed through the imaging optical system, an information transmission section that transmits imaging information necessary for obtaining an in-focus range for the imaging device, and an image transmission section that transmits the image data obtained by the imaging device; and a camera body comprising a connection section on which the camera lens assembly is detachably mounted, an image receiving section that receives image data; an image processing section that applies a predetermined image processing to the image data received by the image receiving section, and an information receiving section that receives the imaging information.

According to the camera system of the present invention, the camera lens assembly transmits the imaging information such as size and number of pixels of the imaging device, and pixel pitch of the imaging device to the camera body. For example, the camera body computes an in-focus range for the imaging device in accordance with the imaging information, so that a user can perform photography through regulation of a distance up to the subject in accordance with the computed degree.

In the camera system according to the present invention as mentioned above, it is preferable that the information transmission section transmits, as the imaging information, at least one of a subject distance up to the subject, a focal length of an imaging optical system, a light-condensing ability, size and number of pixels of the imaging device, and pixel pitch of the imaging device.

According to the camera system of the present invention as mentioned above, it is possible to compute a depth of field and an in-focus range, which are representative of the distance range focusing on the subject, using the subject distance, the focal length of the imaging optical system, the light-condensing ability, size and number of pixels of the imaging device, and pixel pitch of the imaging device.

In the camera system according to the present invention as mentioned above, it is preferable that the camera system further comprises:

an operating section that computes a depth of field and/or an in-focus range in accordance with the imaging information, belonging to the camera lens assembly and/or the camera body; and a display section that displays the depth of field and/or the in-focus range, which are computed in the operating section, belonging to the camera lens assembly and/or the camera body.

Display of the depth of field and/or the in-focus range on the display section makes it possible for a user to recognize a permissible range in-focus for the subject. Thus, according to the camera system of the present invention, it is possible for the user to adjust the distance up to the subject before the photography and to obtain a photograph focussing on the subject.

In the camera system according to the present invention as mentioned above, it is preferable that the camera system further comprises:

an operating section that computes a depth of field and/or an in-focus range in accordance with the imaging information and a subject distance to be entered, belonging to the camera lens assembly and/or the camera body; and a display section that displays the depth of field and/or the in-focus range, which are computed in the operating section, belonging to the camera lens assembly and/or the camera body.

An input of the subject distance by a user makes it possible to compute the depth of field and/or the in-focus range, even in the event that the photography is carried out in the dark place and thus the focusing unit cannot operate properly.

DETAILED DESCRIPTION OF PREFERRED EMBODIMENTS

Embodiments of the present invention will be described with reference to the accompanying drawings.

Figure 1:
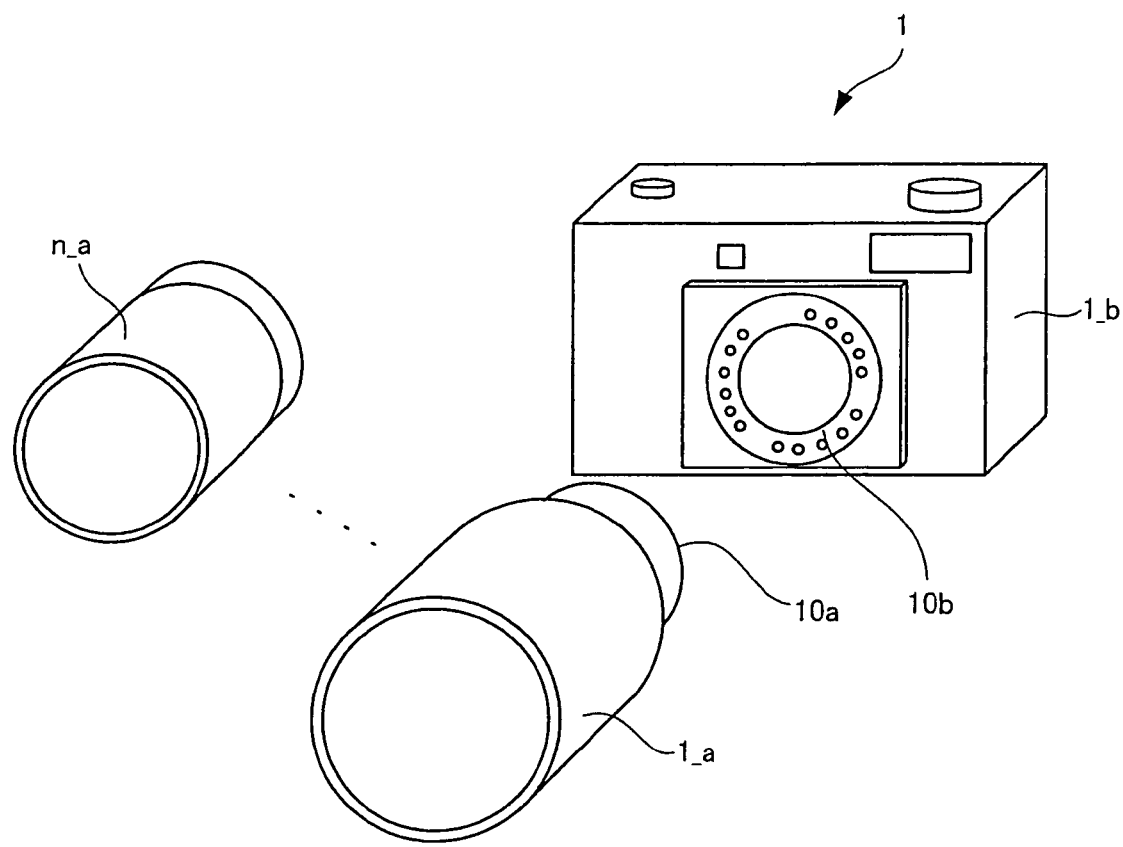
FIG. 1 is an exploded view of a camera system according to an embodiment of the present invention.

FIG. 1 is an exploded view of a camera system according to an embodiment of the present invention.

FIG. 1 shows a camera system 1 having a plurality of sorts of camera lens assemblies 1_a, 2_a, ..., n_a each comprising an image taking lens and a CCD. In the camera system 1, any one of the pluralities of sorts of camera lens assemblies 1_a, 2_a, ..., n_a is selectively used. In the following explanation, it is assumed that the camera lens assembly 1_a is typically selected.

In the camera system 1, the camera lens assembly 1_a, which is loaded with CCD 12a (FIG. 3) and an image taking optical system 11a (FIG. 3), is detachably mounted on a camera body 1_b that is provided with an image display section 1050b (FIG. 3) for displaying a photographic image and a menu image. The camera body 1_b corresponds to an example of the camera body referred to in the present invention. The camera lens assemblies 1_a, 2_a, ..., n_a correspond to an example of the camera lens assembly referred to in the present invention.

The camera lens assembly 1_a is provided with a lens assembly mounting connector 10a. The lens assembly mount connector 10a is detachably engaged with a body mount 10b provided in front of the camera body 1_b. The body mount 10b corresponds to an example of the connection section referred to in the present invention.

Figure 2:
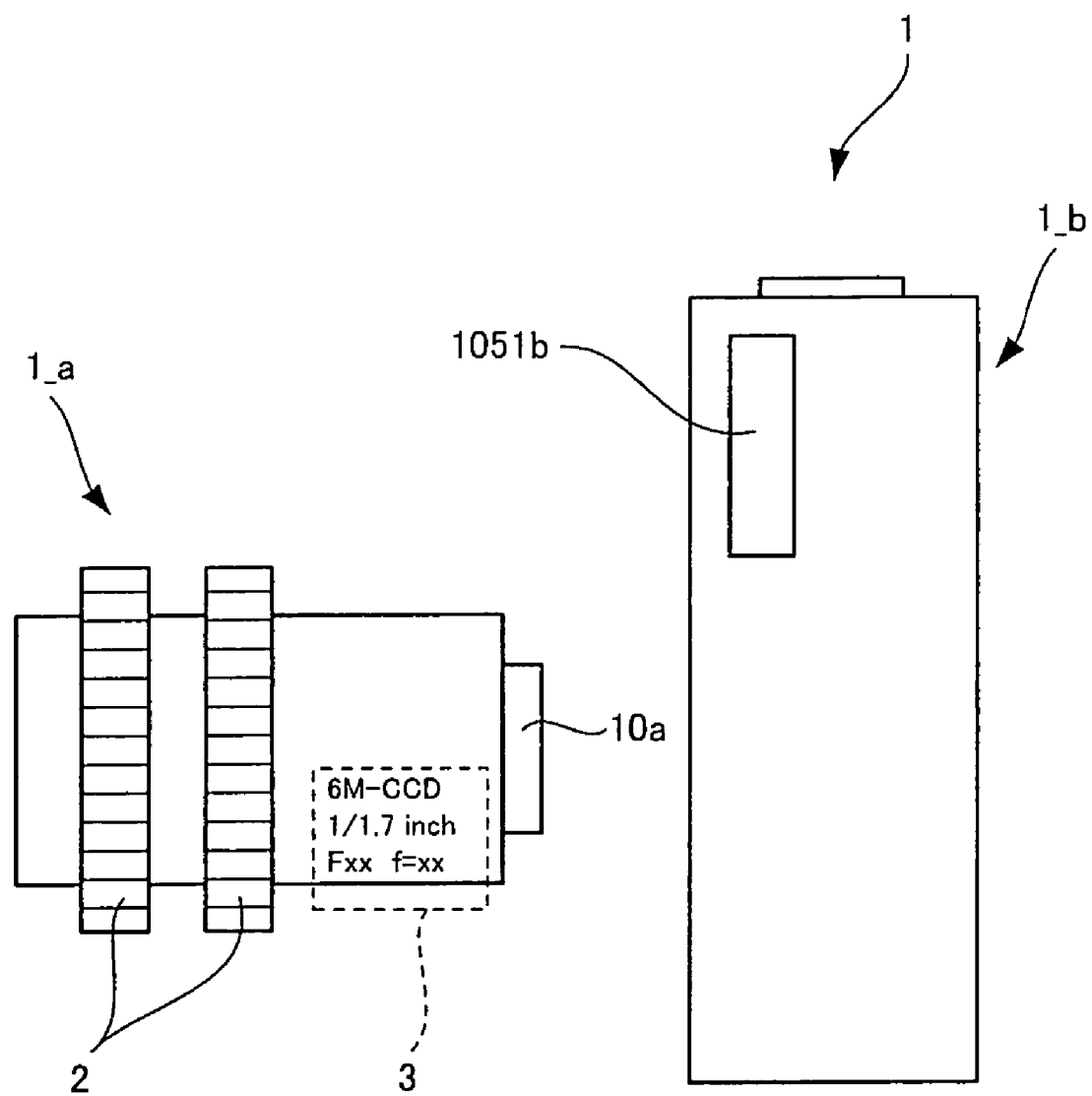
FIG. 2 is a side view of a camera system 1 shown in FIG. 1.

FIG. 2 is a side view of a camera system 1 shown in FIG. 1.

The camera lens assembly 1_a is provided with an operating section 2 for control of a movement of a zoom lens and focus lens. At a side of the camera lens assembly 1_a, there is described CCD information 3 such as a size of the CCD 12a (not illustrated in FIG. 2, and refer to FIG. 3) incorporated into the camera lens assembly 1_a, and the number of pixels. At a side of the camera body 1_b, there is provided an information display section 1051b for displaying character information and the like, which is smaller than the image display section 1050b (not illustrated in FIGS. 1 and 2, and refer to FIG. 3) provided on the back. The information display section 1051b corresponds to an example of the display section referred to in the present invention.

Figure 3:
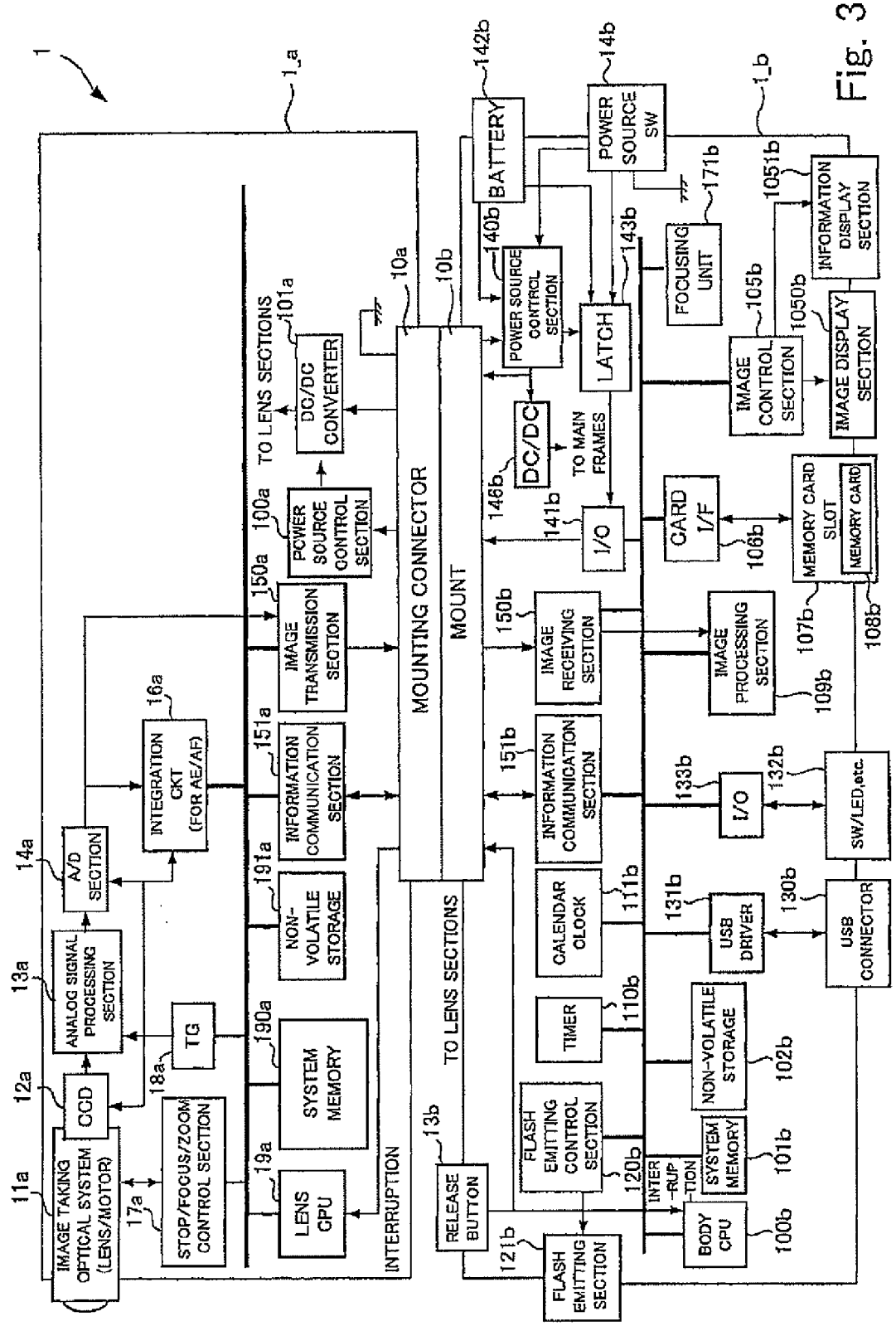
FIG. 3 is an internal structural view of the camera system 1 shown in FIG. 1.

FIG. 3 is an internal structural view of the camera system 1 shown in FIG. 1.

First, there will be explained the structure of the camera lens assembly 1_a.

The camera lens assembly 1_a comprises: an image taking optical system 11a that is provided with various sorts of lenses such as a focus lens and a zoom lens, and a motor for driving those lenses; a stop/focus/zoom control section 17a that controls the motor of the image taking optical system 11a to control a diameter of a stop of the image taking optical system 11a and positions of the focus lens and the zoom lens; a CCD 12a for receiving a subject light image formed through the image taking optical system 11a to create a subject signal representative of the subject light image; an analog signal processing section 13a for performing an amplification of the subject signal and a gain regulation; an A/D conversion section 14a for converting the subject signal of an analog signal to digital image data; a TG (timing generator) 18a for generating a timing signal to the CCD 12a, the analog signal processing section 13a and the A/D conversion section 14a; a lens assembly CPU 19a for controlling each element of the camera lens assembly 1_a and for computing lens positions of the focus lens and the zoom lens; a system memory 190a that stores a program indicative of a processing procedure concerning the AE detection and the AF detection; and a non-volatile storage 191a that stores therein lens assembly parameters such as the number of pixels of the CCD 12a and the aperture value. The image taking optical system 11a corresponds to an example of the image taking optical system referred to in the present invention. The CCD 12a corresponds to an example of the imaging device referred to in the present invention.

The camera lens assembly 1_a further comprises: an information communication section 151a for communicating information such as lens assembly parameters between the camera lens assembly 1_a and the camera body 1_b; and an image transmission section 150a for transmitting photographic image data in which the subject light image is read by the camera body 1_b. The information communication section 151a corresponds to an example of the information communication section referred to in the present invention.

In the camera lens assembly 1_a, when the CCD 12a receives the subject light image, the camera lens assembly 1_a creates three types of image data such as low resolution data for through image use as to the subject image now in the photographic view angle, which is to be displayed on the image display section 1050b of the camera body 1_b, still picture image data representative of a still picture image when a release button 13b is depressed, and dynamic picture image data representative of a dynamic picture image. The low resolution data is low in resolution and is a temporal data. Thus the image transmission section 150a transmits the low resolution data to the camera body 1_b and also to an integration circuit 16a.

The camera lens assembly 1_a still further comprises: a power source control section 100a for controlling a power to be supplied to the integration circuit 16a for detecting luminance (AE detection) of the subject and contrast (AF detection) of the subject in accordance with the low resolution data, the camera lens assembly 1_a, and the various elements of the camera lens assembly 1_a, and a DC/DC converter 101a, in which a DC voltage is converted into a different DC voltage.

Next, there will be explained the camera body 1_b.

The camera body 1_b comprises: a focusing unit 171b for computing a subject distance up to the subject in accordance with the low resolution data transmitted from the camera lens assembly 1_a; a body CPU 100b for controlling various elements of the camera system 1 and also for computing depth of field in accordance with the subject distance and the lens assembly parameters; a system memory 101b that stores a program; an information communication section 151b for communicating information between the camera lens assembly 1a and the camera body 1_b; an image receiving section 150b for receiving image data transmitted from the camera lens assembly 1_a; a non-volatile storage 102b for storing lens assembly parameters received by the information communication section 151b; a timer 110b for timer photography; a calendar timer section 111b for displaying a calendar timer on the image display section 1050b; a USB driver 131b to which a personal computer and the like are connected via a USB connector 130b; a flash emitting section 121b for emitting flash through a flash emitting window provided on the camera body 1_b; a flash emitting control section 120b for controlling an amount of light emission by the flash emitting section 121b; a switch/LED 132B that is controlled by the body CPU 100b through an I/O 133b; a power source SW 14b for turning on and off a power source of the camera system 1; a battery 142b for supplying an electric power to the camera system 1; a power source control section 140b for controlling an electric power to be supplied from battery 142b to the respective elements of the camera body 1_b; a DC/DC converter 146b for regulating the electric power; a latch 143b that maintains and supplies the electric power via an I/O 141b to the camera lens assembly 1_a; an image processing section 109b for applying various sorts of processing such as compression processing to the image data received by the image receiving section 150b; a display control section 105b for controlling a display on the image display section 1050b and the information display section 1051b; the image display section 1050b on which various menu screens and through images based on the low resolution data are displayed; the information display section 1051b on which the body CPU 100 and depth of field to be computed are displayed; and a memory card slot 107b on which there may be mounted a memory card 108b in which image data created at the time of photography is compressed by the image processing section 109b, and the compressed image data is recorded via a card connector, i.e., media connector, or card I/F 106b on the memory card 108b. The image receiving section 150b corresponds to an example of the image receiving section referred to in the present invention. The information communication section 151b corresponds to an example of the information communication section referred to in the present invention.

The image processing section 109b corresponds to an example of the image processing section referred to in the present invention. The body CPU 100 corresponds to an example of the operating section referred to in the present invention.

The camera system 1 comprises the camera lens assembly 1_a and the camera body 1_b and is constructed in such a manner that the lens assembly mounting connector 10a is detachably mounted on the camera body mount 10b. Between the camera lens assembly 1_a and the camera body 1_b there is performed a communication via electric contacts provided on the lens assembly mounting connector 10a and the camera body mount 10b.

In the camera system 1 according to the present embodiment, the information display section 1051b of the camera body 1_b displays a depth of field and an in-focus range.

Figure 4:
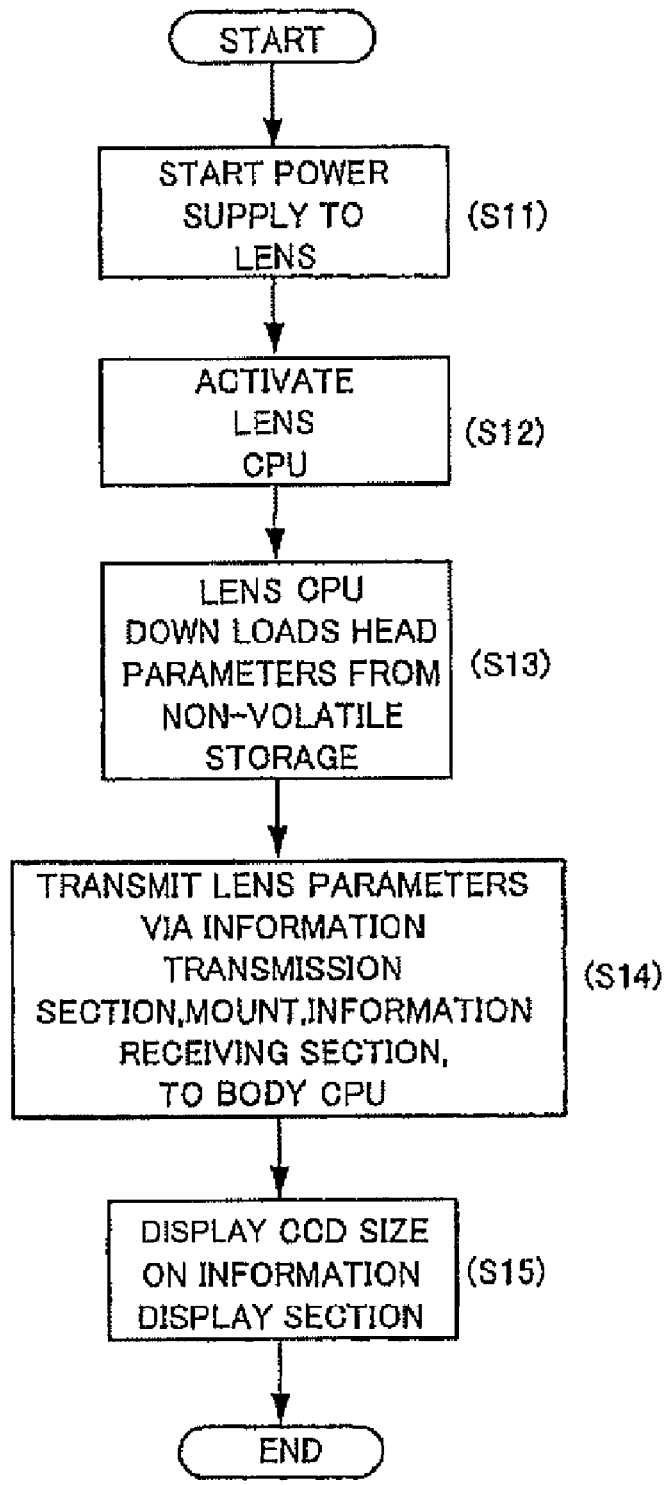
FIG. 4 is a flowchart useful for understanding a series of processing up to displaying of information on an information display section.
Figure 5:
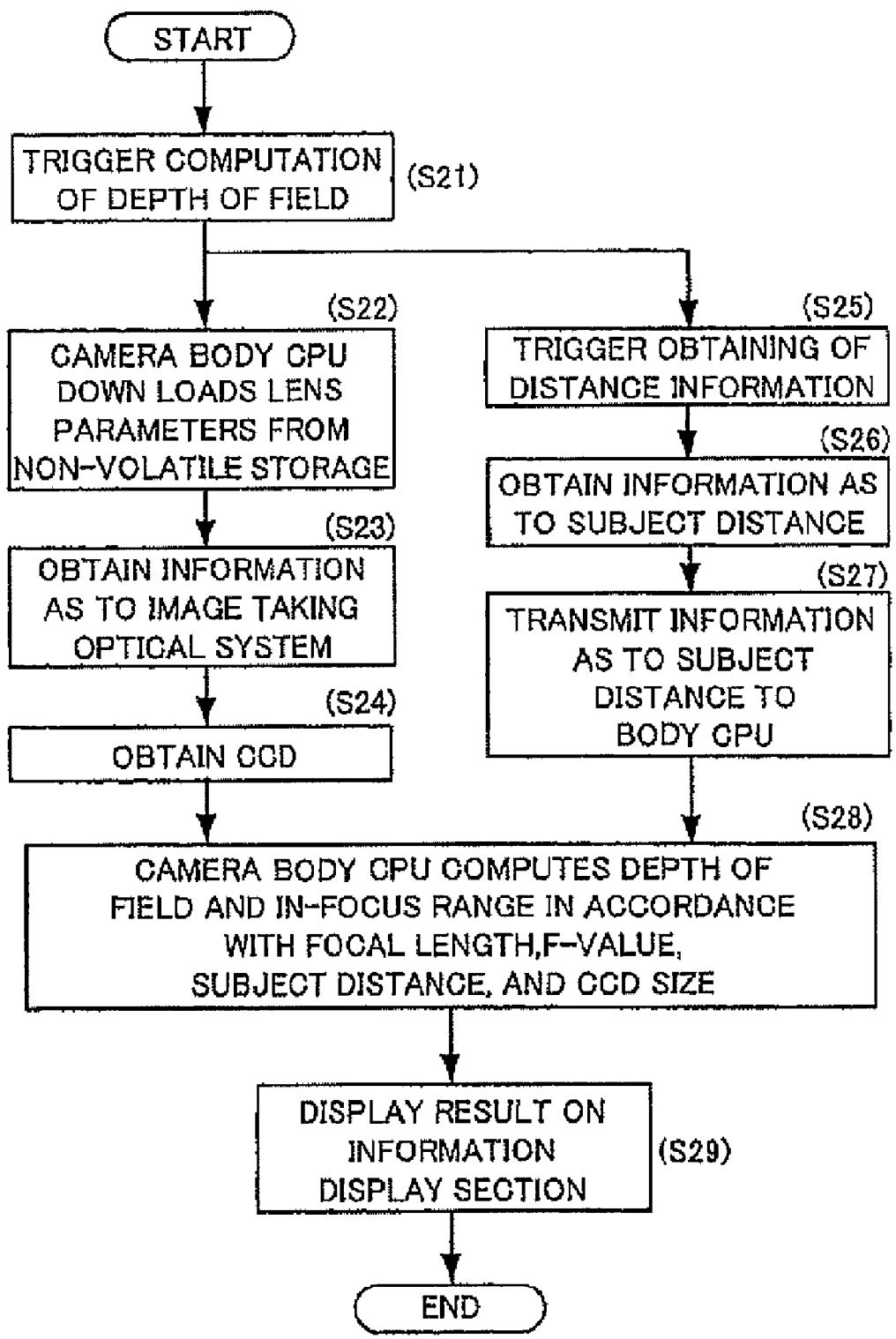
FIG. 5 is a flowchart useful for understanding a series of processing up to displaying of information on an information display section.

FIG. 4 and FIG. 5 are each a flowchart useful for understanding a series of processing up to displaying of the depth of field and the in-focus range on the information display section 1051b.

The non-volatile storage 191a of the camera lens assembly 1_a beforehand stores, as lens assembly parameters, a size of the CCD 12a, the number of pixels of the CCD 12a, F-value of the image taking optical system 11a, and the focal length.

When a user turns on the power source SW 14b, an electric power is supplied from the battery 142b to the camera system 1 (step S11 of FIG. 4). When the electric power is supplied to the camera lens assembly 1_a, the lens assembly CPU 19a is activated (step S12 of FIG. 4).

First, the lens assembly CPU 19a obtains the lens assembly parameters stored in the non-volatile storage 191a of the camera lens assembly 1_a (step S13 of FIG. 4).

Next, the obtained lens assembly parameters are transmitted via the information communication section 151a, the mount contact, and the information communication section 151b to the body CPU 100b (step S14 of FIG. 4).

The lens assembly parameters, which are fed to the body CPU 100b, are stored in the non-volatile storage 102b of the body CPU 100b. Of the lens assembly parameters, the CCD information 3 shown in FIG. 2 is fed to the display control section 105b and is displayed on the information display section 1051b (step S15 of FIG. 4).

A user can compute 35 mm corresponding focal length in accordance with the CCD information 3 displayed on the information display section 1051b, so that the user can confirm the photographic view angle where it is converted into the film camera which is familiar to the user.

When the user uses a handler (not illustrated) provided on the camera body 1_b to set up the image data size, a photographic mode, and needs of the flash, a computation of the depth of field is started (step S21 of FIG. 5).

The body CPU 100b sends a transmission instruction for low resolution data via the information communication section 151b and the information communication section 151a to the camera lens assembly 1_a.

In the camera lens assembly 1_a, the focus lens, which is included in the image taking optical system, is driven in the optical axis direction in accordance with an instruction from the lens assembly CPU 10a, and the CCD 12a roughly reads the subject light image in the timing from the TG 18a, so that the low resolution data is generated via the analog signal processing section 13a and the A/D conversion section 14a. The low resolution data is transmitted to the integration circuit 16a so as to be subjected to the AF processing and the AE processing. The generated low resolution data is also transmitted via the information communication section 151a and the information communication section 151b to the body CPU 100*b* and the focusing unit 171*b* (step S25 of FIG. 5). The focusing unit 171*b* computes the subject distance in accordance with the low resolution data (step S26 of FIG. 5). The thus computed subject distance is transmitted to the body CPU 100*b* (step S27 of FIG. 5).

In the body CPU 100*b*, the lens assembly parameters, which are stored in the non-volatile storage 102*b* of the camera body 1__*b*, are obtained (step S22 of FIG. 5). At that time, in the body CPU 100*b*, there are obtained information related to the image taking optical system 11*a* such as F-value of the image taking optical system 11*a* and focal length (step S23 of FIG. 5), and information related to the CCD12*a* such as a size of the CCD12*a* and the number of pixels (step S24 of FIG. 5). The body CPU 100*b* computes a depth of field and the in-focus range in accordance with the subject distance transmitted from the focusing unit 171*b* and the lens assembly parameters (step S28 of FIG. 5). The depth of field is determined in accordance with the following formula.

The depth of field=$d \times F \times a/(f^2 + d \times f \times a)$ where d: a permissible circle of confusion (it is decided by the pitch of the CCD 12*a*, and is computed from the size of the CCD 12*a* and the number of pixels), F: F-value, a: a subject distance, f: focal length A result of the computation is transmitted to the control section 105*b* and is displayed on the image display section 1050*b* of the camera body 1__*b*. For example, in case of "CCD size: 1/1.7 inch, 6M pixels, F2.8, subject distance: 2.0 m, focal length: 28 mm, and APS size", there is displayed information such as "in-focus range: 2.3 m to 4.2 m, and depth of field: 2.4".

In this manner, a display of the in-focus range and the depth of field on the information display section 1051*b* makes it possible for a user to, for example, move lengths of a plurality of subjects to the in-focus range to perform photography. This feature makes it possible to obtain a photographic image free from out of focus.

Next, there will be explained the second embodiment. A camera system of the second embodiment is substantially same as the camera system 1 of the first embodiment in the structure. Thus, in the following figures, the same parts are denoted by the same reference numbers as those of FIG. 1 to FIG. 5, and the redundant explanation will be omitted, and only the different points will be explained.

Figure 6:
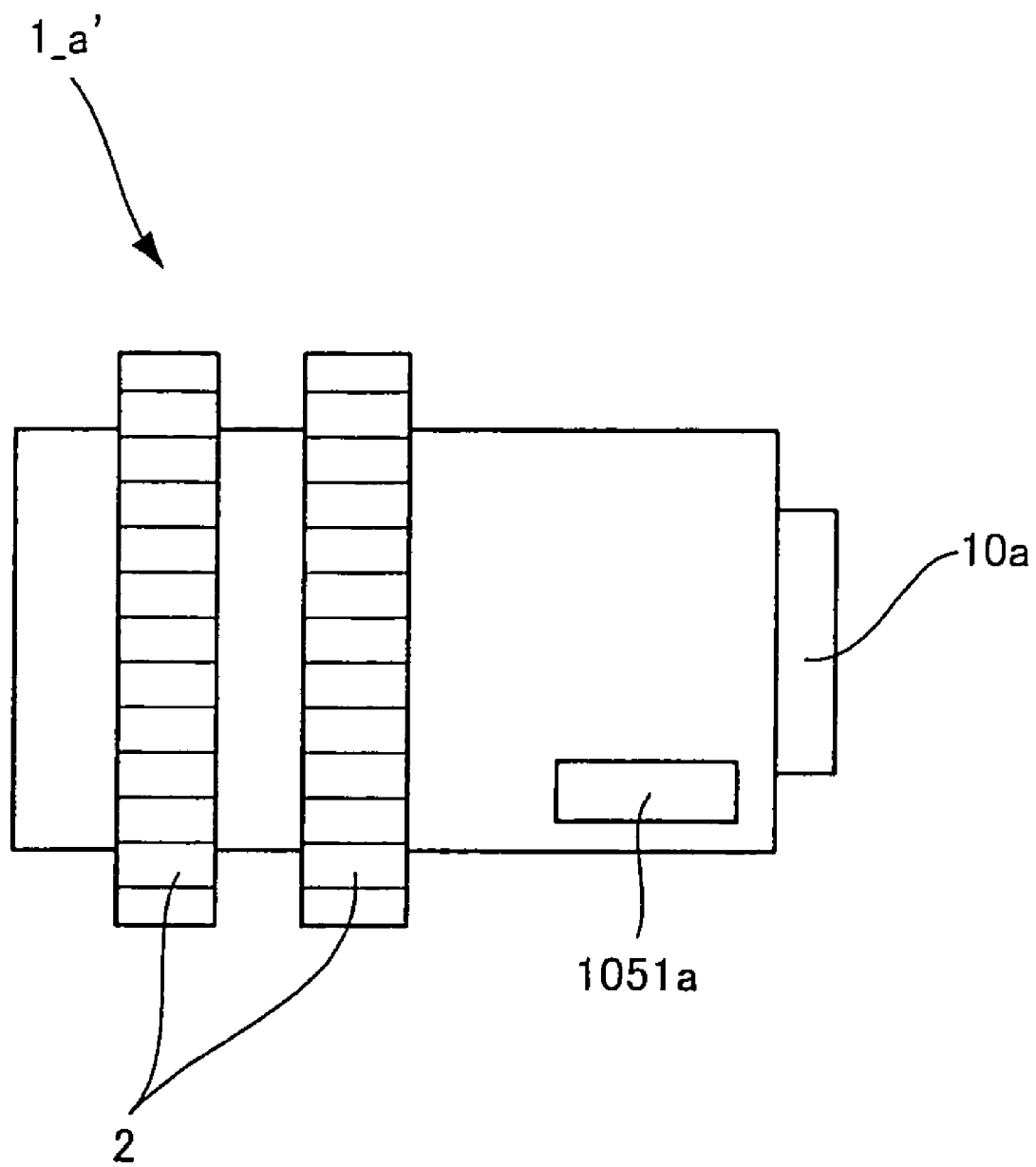
FIG. 6 is a side view of a camera lens assembly 1_a' in a camera system according to a second embodiment.
Figure 7:
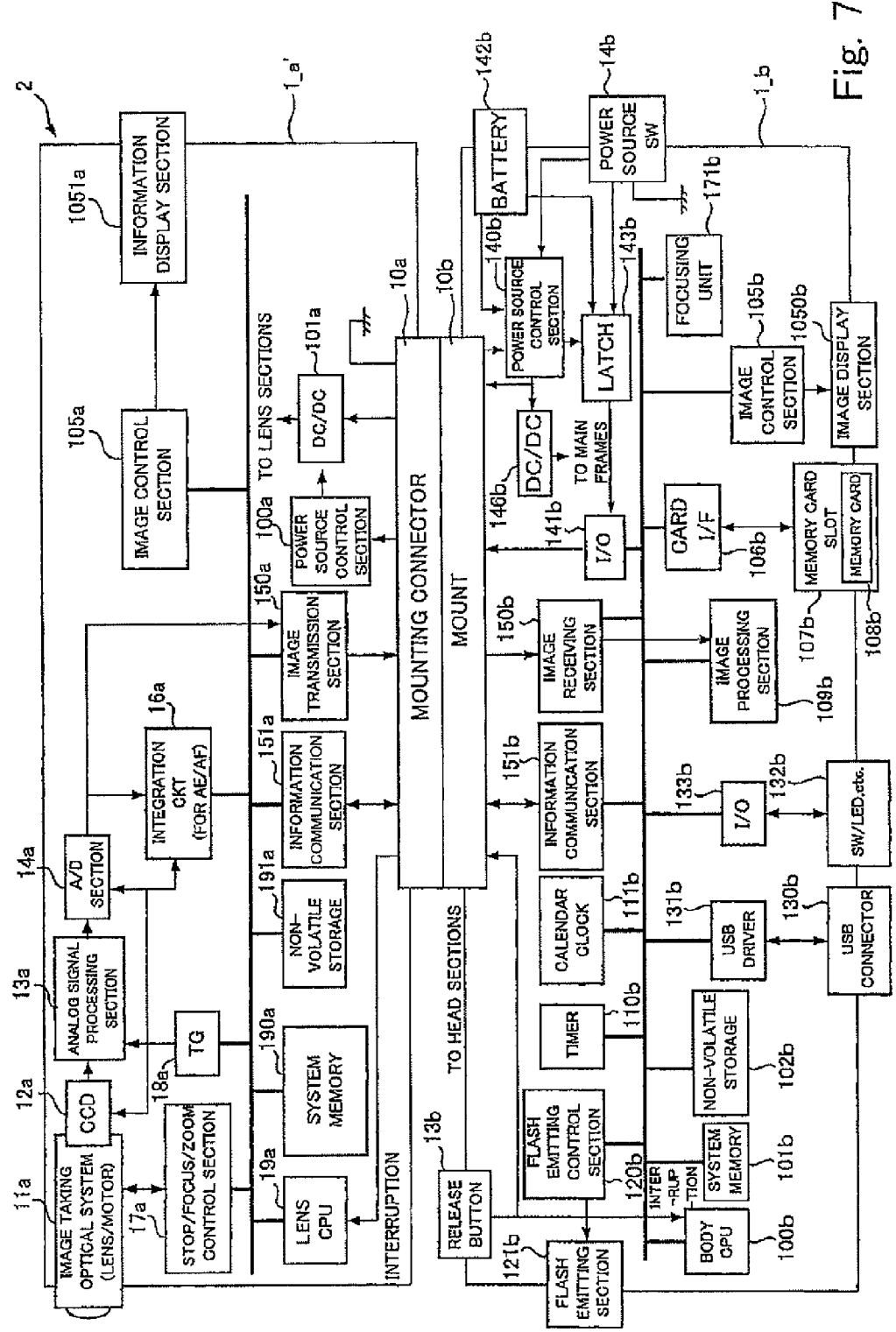
FIG. 7 is an internal structural view of the camera system 2 according to the second embodiment.

FIG. 6 is a side view of a camera lens assembly 1__*a*' in a camera system according to the second embodiment. FIG. 7 is an internal structural view of the camera system 2 according to the second embodiment.

As shown in FIG. 6, on the side of the camera lens assembly 1__*a*' there is provided an information display section 1051*a* for displaying a depth of field and the like. The information display section 1051*a* corresponds to the example of the information display section referred to in the present invention.

As shown in FIG. 7, according to the camera system 2 of the second embodiment, the camera body 1__*b* is not provided with the information display section 1051*b*. The camera lens assembly 1__*a*' is provided with an information display section 1051*a* and a display control section 105*a* for controlling a display of information to the information display section 1051*a*.

Figure 8:
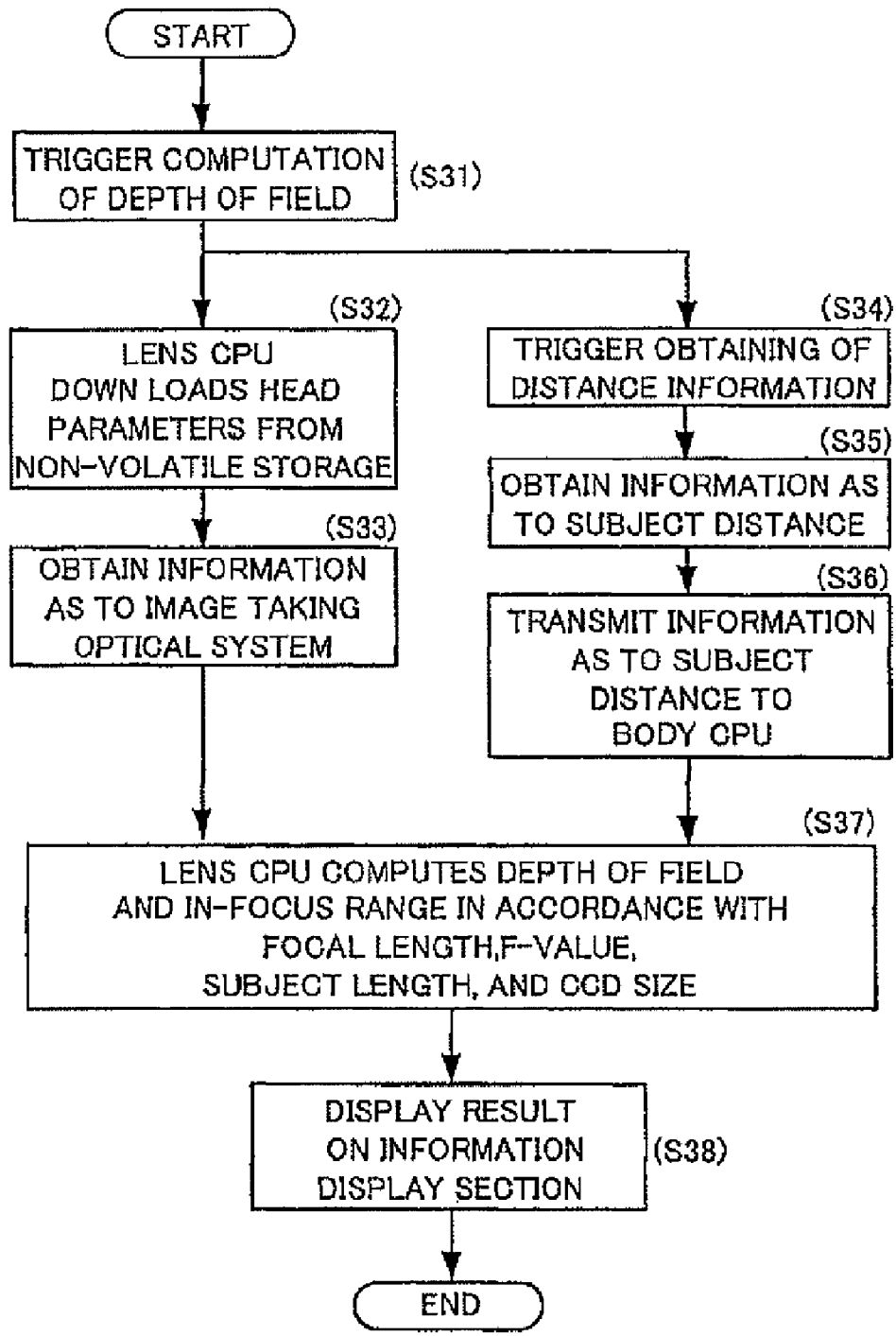
FIG. 8 is a flowchart useful for understanding a series of processing up to displaying of information on an information display section 1051a of the camera lens assembly of the camera lens assembly 1_a'.

FIG. 8 is a flowchart useful for understanding a series of processing up to displaying of information on an information display section 1051*a* of the camera lens assembly of the camera lens assembly 1__*a*'.

In a similar fashion to that of the step S21 of FIG. 5, when the user sets up the image data size, a photographic mode, and needs of the flash, a computation of the depth of field is started (step S31 of FIG. 8).

According to the present embodiment, the lens assembly CPU 19*a* of the camera lens assembly 1__*a*' instructs respective elements of the camera lens assembly 1__*a*' to generate the low-resolution data. The low-resolution data thus generated is transmitted via the image transmission section 150*a* and the image receiving section 150*b* to the body CPU 100*b* and the focusing unit 171*b* (step S34 of FIG. 8). The focusing unit 171*b* computes the subject distance in accordance with the low resolution data (step S35 of FIG. 8). The computed subject distance is transmitted via the information communication section 151*b* and the information communication section 151*a* to the lens assembly CPU 19*a*.

The lens assembly CPU 19*a* obtains the lens assembly parameters stored in the non-volatile storage 191*a* of the camera lens assembly 1__*a*' (steps S32 and S33 of FIG. 8).

Further, the lens assembly CPU 19*a* computes a depth of field and an in-focus range in accordance with the lens assembly parameters and the subject distance transmitted from the focusing unit 171*b* (step S37 of FIG. 8).

The computed result is transmitted to the display control section 105*a* of the camera lens assembly 1__*a*' so as to be displayed on the information display section 1051*a*.

In this manner, it is acceptable that the information such as the depth of field and the in-focus range are displayed on the information display section 1051*a* of the camera lens assembly 1__*a*', but not information display section 1051*b* of the camera body 1__*b*. In this case, in order to reduce the time for data communication, it is preferable that the lens assembly CPU 19*a* of the camera lens assembly 1__*a*', but not the body CPU 100*b* of the camera body 1__*b* computes the depth of field and the in-focus range.

Next, there will be explained a third embodiment. A camera system of the third embodiment is substantially same as the camera systems of the first embodiment and the second embodiment in the structure. Thus, in the following figures, the same parts are denoted by the same reference numbers as those of FIG. 1 to FIG. 8, and the redundant explanation will be omitted, and only the different points will be explained.

Figure 9:
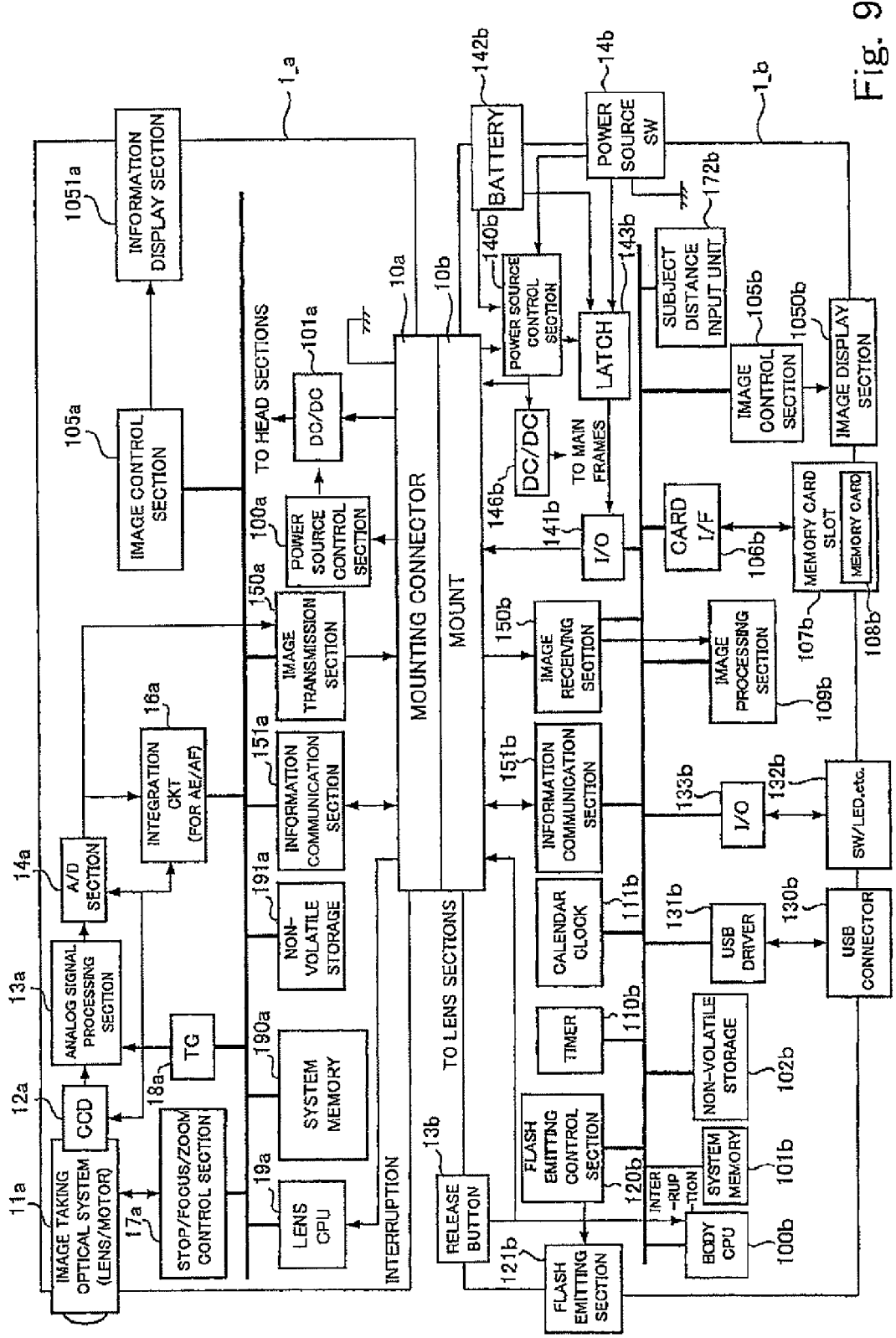
FIG. 9 is an internal structural view of the camera system 3 according to the present embodiment.

FIG. 9 is an internal structural view of the camera system 3 according to the present embodiment.

According to the camera system 3 as shown in FIG. 9, a subject distance input unit 172*b* replaces the focusing unit 171*b*. According to the camera system 3, the user uses the subject distance input unit 172*b* to input a distance up to the subject. The entered subject distance is transmitted to the body CPU 100*b* so as to be used for computation of a depth of field and the like.

In this manner, the user's input of the subject distance makes it possible to compute a depth of field, even if the user perform photography at the dark place and cannot compute the depth of field with a focusing unit.

According to the present embodiments, there is explained the camera system provided with the CCD as an imaging device. However, it is acceptable that the imaging device referred to in the present invention is the MOS and the like.

Further, according to the present embodiments, there are explained the examples of the information communication section that transmits a size of the CCD, the number of pixels of the CCD, F-value of an image taking optical system, and a focal length on a batch basis in form of the lens assembly parameters. However, any one is acceptable, as the information transmission section referred to in the present invention, which transmits at least one of a subject distance up to the subject, a focal length of an image taking optical system, a light-condensing ability, size and number of pixels of the imaging device, and pixel pitch of the imaging device.

Recently, there is developed a liquid lens in which a voltage is applied to a liquid accommodated in a vessel to vary the shape of a liquid surface so that a refractivity of a light is controlled. According to the present embodiments, there is explained the example in which the usual lens is used as the imaging optical system referred to in the present invention. However, it is acceptable that the imaging optical system referred to in the present invention is a liquid lens. In this case, what is meant by "drive of the imaging optical system" refers to a work for applying a voltage to a liquid so as to perform working equivalent to an effect that the usual lens is moved in the optical axis direction.

As mentioned above, according to the present invention, it is possible to implement a camera system comprising: a camera lens assembly that is loaded with an image taking optical system for forming a subject light image and an imaging device that reads the subject light image to generate image data; and a camera body on which the camera lens assembly is detachably mounted, wherein the camera system is capable of computing the depth of field and the in-focus range, even if the camera lens assembly is interchanged.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A camera system comprising:
    a camera lens assembly comprising an imaging optical system through which a subject light image passes, an imaging device that generates, upon receipt of the subject light passing through the imaging optical system, image data representative of the subject light, an information transmission section that transmits imaging information necessary for obtaining an in-focus range for the imaging device, and an image transmission section that transmits the image data generated by the imaging device; and
    a camera body comprising a connection section on which the camera lens assembly is detachably mounted, an image receiving section that receives the image data; an image processing section that applies a predetermined image processing to the image data received by the image receiving section, and an information receiving section that receives the imaging information,
    wherein the information transmission section transmits the imaging information to the camera body.

2. A camera system according to claim 1, wherein the imaging information transmitted by the information transmission section includes the size of an imaging surface of the imaging device.

3. A camera system according to claim 1, wherein the camera system further comprises:
    an image display section provided in the camera body;
    an operating section, provided in the camera lens assembly or the camera body, that computes a depth of field or an in-focus range in accordance with the imaging information; and
    a second display section separate from the image display section, provided in the camera lens assembly or the camera body, that displays the depth of field or the in-focus range, which are computed in the operating section.

4. A camera system according to claim 1, wherein the camera system further comprises:
    an image display section provided in the camera body;
    an operating section, provided in the camera lens assembly or the camera body, that computes a depth of field or an in-focus range in accordance with the imaging information and a subject distance to be entered; and
    a second display section separate from the image display section, provided in the camera lens assembly or the camera body, that displays the depth of field or the in-focus range, which are computed in the operating section.

* * * * *